May 22, 1956
A. M. STONER ET AL
2,746,758
CHUCKS
Filed May 7, 1953
2 Sheets-Sheet 1
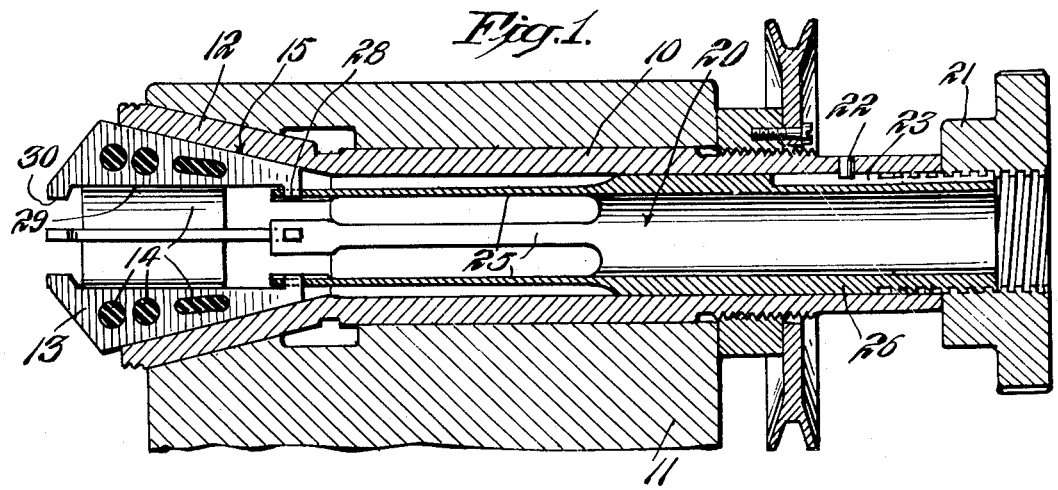
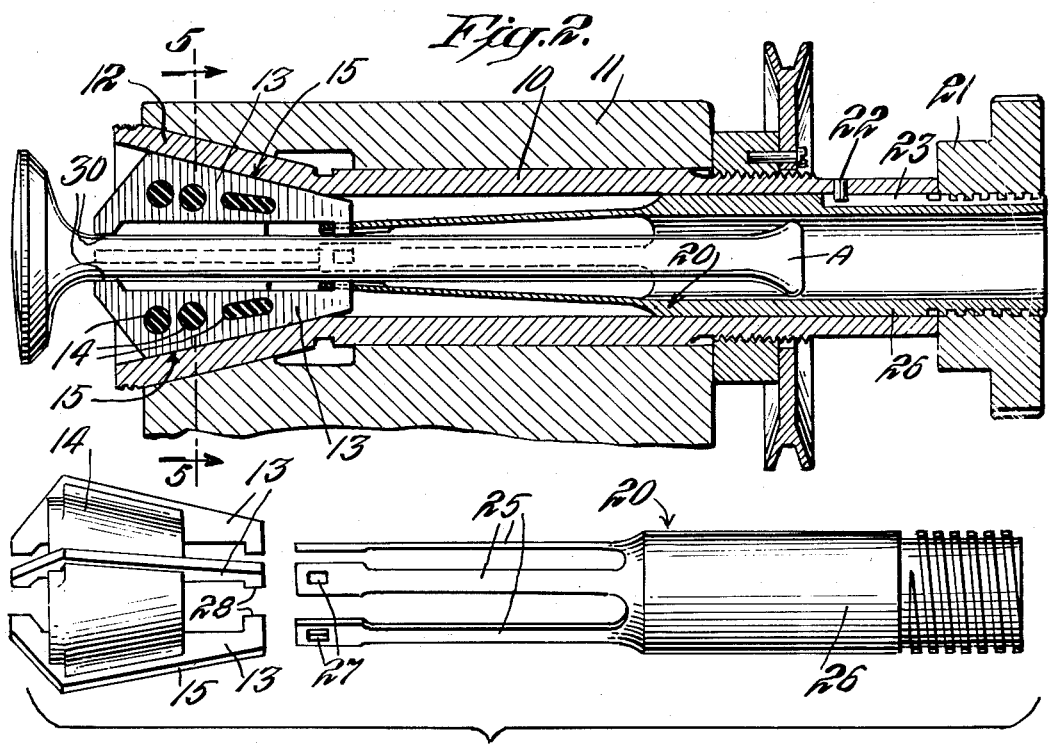
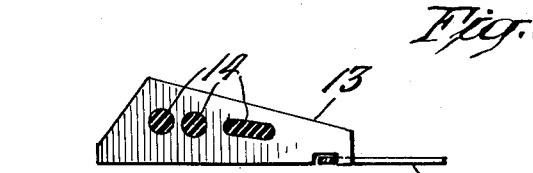
INVENTORS
ARTHUR M. STONER
GIRARD S. HAVILAND
BY
Byerly, Townsend & Watson
ATTORNEYS May 22, 1956     A. M. STONER ET AL     2,746,758
CHUCKS
Filed May 7, 1953                                  2 Sheets—Sheet 2
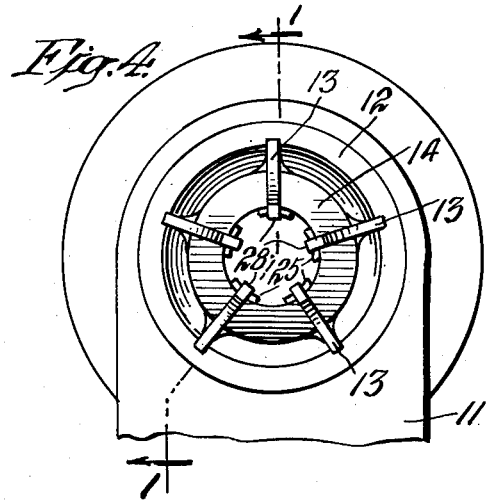
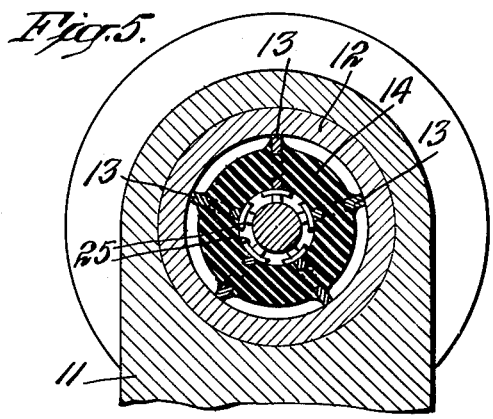
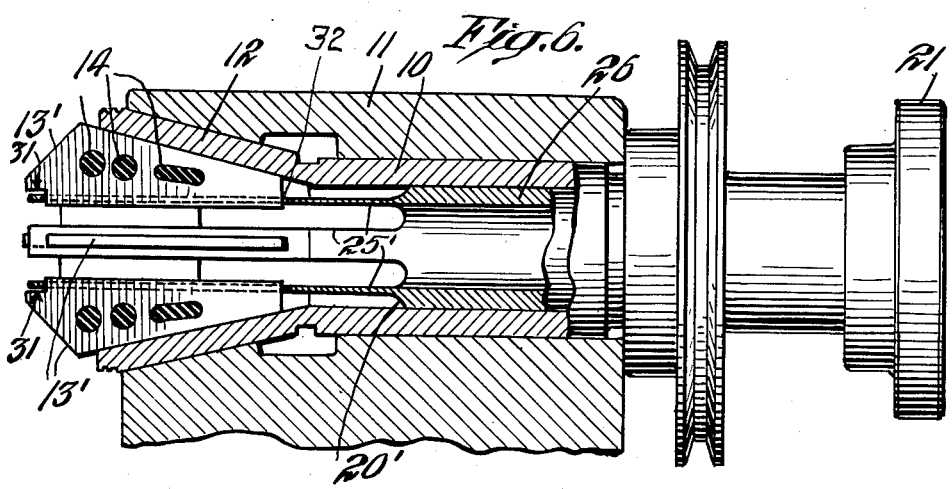
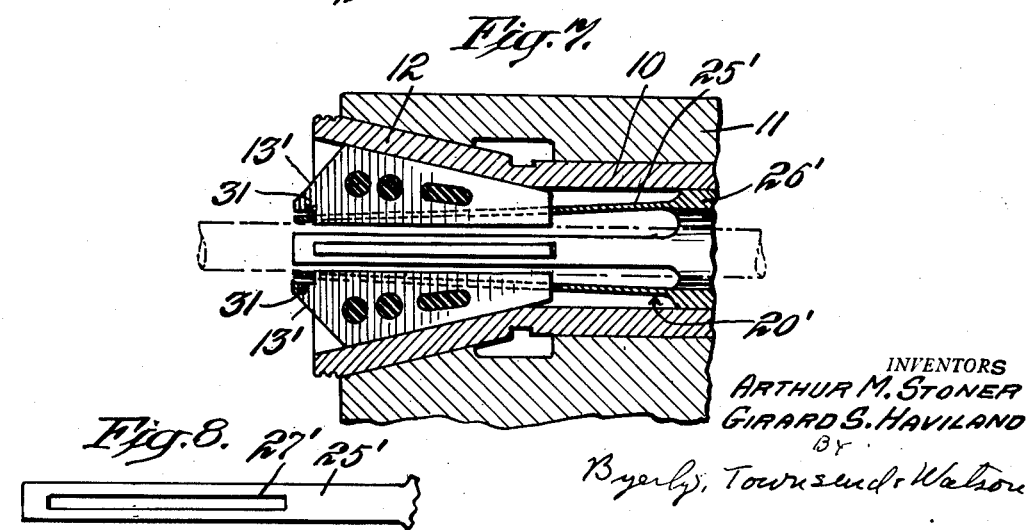
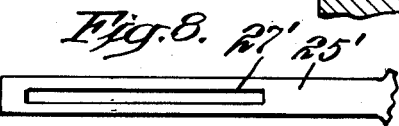
INVENTORS
ARTHUR M. STONER
GIRARD S. HAVILAND
BY
Byerly, Townsend & Watson
ATTORNEYS

United States Patent Office 2,746,758
Patented May 22, 1956

2,746,758
CHUCKS

Arthur M. Stoner, Madison, and Girard S. Haviland, Wethersfield, Conn., assignors, by mesne assignments, to The Jacobs Manufacturing Company, West Hartford, Conn., a corporation of New Jersey Application May 7, 1953, Serial No. 353,477

4 Claims. (Cl. 279—53)

This invention relates to chucks and aims to provide a precision chuck with large range of capacity. The capacity of the new chuck, that is to say, the amount of its radial adjustability, is at least twice that of any previous chuck in which the jaws are positioned with comparable accuracy.

Prior to the present invention, the chucks which have provided the greatest radial adjustment combined with accurate positioning of the jaws have been those containing collets in which the jaws are integrated and held in position by flexible material such as rubber. The collets which are sold under the registered trademark "Rubber-Flex" are so constructed. The jaws of such collets, which are tapered on their outer surfaces, are forced into a cone in order to close them on the work. In this closing movement, the rubber between the jaws must be displaced and made to flow to permit the jaws to come closer together. The rubber between the jaws holds the outer edges of the jaws in firm engagement with the cone and thus insures accurate positioning of the jaws. At the same time it offers considerable resistance to movement of the collet into the cone which must be overcome by an operator for forcing the collet into the cone to tighten the collet upon the object to be held in it. Since in the closing movement the jaws move radially inward as well as longitudinally, while the operator has only longitudinal movement, there is necessarily friction between the operator and the jaws which, in the past, has created serious problems. If this friction becomes excessive, the inward movement of the jaws is jerky and irregular so that the jaws are not maintained in accurate position by constant pressure of the outer surfaces of all of them against the cone. In the past, this difficulty has been overcome to some extent by providing very accurate ground engaging surfaces on the operator and on the jaws to make the sliding friction as slight and as even as is possible. However, even with the use of this expensive expedient, the sliding friction between the operator and the jaws is the factor which limits the extent to which the collet may be forced into the cone without disturbing the accurate positioning of the jaws. Such other expedients as have been suggested for reducing friction between a chuck operator and the jaws of the chuck have been too complicated and expensive to be of practical use.

The present invention provides a simple and inexpensive chuck operator capable of drawing a "Rubber-Flex" collet into a cone without any sliding friction between the operator and the jaws of the collet. This is accomplished in accordance with the invention by the provision on the operator of long fingers which are flexible in radial directions. The outer ends of these fingers are the only part of the operator which engages the jaws, and the outer ends of the fingers move inwardly with the inward movement of the jaws, thus avoiding all sliding friction between the jaws and the operator. We find that by this means it is possible to double the radial adjustment which has previously been obtained in precision chucks containing "Rubber-Flex" collets.

A further advantage of the invention is that it permits placing the entire mechanism for closing the collet behind the collet where it is out of the way.

In order that our invention may be clearly understood, we will describe in detail specific embodiments of it which are shown in the accompanying drawings in which Figs. 1 to 5 show a chuck for a valve refacing machine embodying our invention, and Figs. 6 and 7 show a chuck for engaging a tool embodying our invention in a slightly different form:

Figs. 1 and 2 are axial sections of a valve refacing machine chuck in open and closed positions;

Fig. 3 is an expanded view of the collet and operator of the chuck;

Fig. 3a is a fragmentary view showing a modification;

Fig. 4 is a front end view of the chuck;

Fig. 5 is a section on the line 5—5 of Fig. 2;

Figs. 6 and 7 are axial sections of a tool chuck in open and closed positions; and Fig. 8 is a side view of one of the fingers of the operator.

The valve refacing machine shown in Figs. 1 and 2 has a hollow pulley-driven spindle or shaft 10 mounted in an external bearing 11. At the outer end of the spindle 10 is a cone 12 in which is placed a "Rubber-Flex" collet of the type shown in U. S. Patents #2,346,706 and #2,459,899. As shown in Figs. 1, 2, 4 and 5, the collet consists of a number of steel jaws 13 integrated by an annular mass 14 of rubber or the like which extends between the jaws and through openings therein. The outer edges 15 of the jaws are tapered to fit the cone 12.

The chuck operator 20 for closing the jaws on the work consists of a fingered sleeve slidably mounted within the hollow shaft 10. A draw-back nut 21 is screwed on a thread at the rear end of the operator 20 and abuts the rear end of the hollow shaft 10. The operator is prevented from turning with respect to the shaft 10 by a pin-and-slot connection 22, 23. Flexible fingers 25, equal in number with the number of jaws of the collet, extend from the front end of the sleeve portion 26 of the operator. The fingers 25 are long (that is, their length is great compared to their transverse dimensions) and are flexible in radial directions. In the form shown, they are formed integral with the sleeve portion of the operator.

The outer end portion of each finger 25 engages and is interlocked with one of the jaws of the collet. In the form shown in Figs. 1 to 3, the engagement is provided by a hole 27 at the outer end of each finger embracing a projection 28 at the inner edge of each jaw. This type of engagement is convenient in a chuck intended to hold a valve stem, for the jaws of such chucks are desirably provided with long central recesses 29 so that only projections 30 and 28 at the ends of the jaws engage the work. This permits firm engagement of a valve stem, even though the stem may be slightly bent. The projection at the rear end of the jaws in this construction provides a convenient means for engaging the outer ends of the fingers of the operator. Similar engaging means may easily be provided by notching the jaws when jaws with straight inner edges are used, as indicated in Fig. 3a.

Although it is essential that the fingers 25 be flexible, it is not essential that they be resilient. It is, however, difficult to make them flexible without also giving them some resiliency, and this resiliency provides a convenient means for maintaining holes in the ends of the fingers in engagement with projections on the ends of the jaws. The flexibility of the fingers and of the rubber of the collet makes it easy to disengage and reengage the fingers and jaws when the parts are withdrawn from the hollow shaft as shown in Fig. 3.

The operation of the chuck in closing its jaws upon the work is apparent from an examination of Figs. 1 and 2. The jaws are widely separated in their open position shown in Fig. 1, which is of special importance when the machine is to be used for refacing a valve whose stem has an enlarged head A at its inner end, as this head can freely pass between the open jaws. Owing to the length and flexibility of the fingers 25, the jaws can be closed through a large radial distance. Thus, they may be drawn from a position in which they project beyond the outer end of the cone (as shown in Fig. 1) to a position in which they project beyond the inner end of the cone 12 (as shown in Fig. 2), thus giving them an inward movement even greater than the difference between the radii of the two ends of the cone. In the course of this operation, the fingers 25 bend radially inward as shown in Fig. 2, so that there is no relative radial motion between the jaws and the ends of the fingers engaging them, and consequently no sliding friction between the jaws and the operator.

Figs. 6, 7 and 8 show a modified construction which may be used to advantage when it is desired to reduce the overall length of the chuck assembly. In this form, the flexible fingers 25' engage the jaws 13' of the collet at their front ends instead of at their rear ends. Each finger contains a long slot 27' which surrounds the inner portion of one of the jaws 13' and engages a notch 31 in the outer end of each jaw. The length of each slot 27' is such that when its front end engages the notch 31 at the front of the jaw, a clearance 32 is provided between the rear end of the slot and the rear end of the jaw. Thus, as in the first modification described, it is only the outer end of each finger which engages a jaw when the operator is drawing the collet into the cone to close the jaws, so that, as before, all sliding friction between the operator and the jaws is avoided in the closing operation. Of course, when the operator is moved to the left to move the jaws from their closed position (Fig. 7) to their open position (Fig. 6), the inner ends of the slots 27' slide along the inner ends of the jaws. This friction during the opening movement is of no consequence, as the precision character of the chuck depends only on correctly positioning the jaws against the work during the closing of the jaws.

The two modifications which have been described are alike in that the only engaging surfaces of the jaws and operator which are loaded as the jaws are closed are located at the front or outer end of the fingers of the operator. Thus, in the form shown in Figs. 1 and 2, an inwardly facing surface at the end of each finger, namely, the outer edge of its hole 27, is drawn against an outwardly facing surface of the jaw, namely, the front edge of the projection 28. In the modification shown in Figs. 6 and 7, an inwardly facing surface, the front edge of the slot 27', at the outer end of each finger, is drawn against an outwardly facing surface of the jaw, the vertical edge of the notch 31. These loaded engaging surfaces are the only places where detrimental sliding friction could occur in drawing in the jaws, and the flexibility of the fingers prevents any sliding between these loaded engaging surfaces.

What is claimed is:

1. A chuck comprising the combination with a hollow shaft having a hollow cone at one end, of a plurality of thin circumferentially spaced tapered jaws within the cone, a body of non-metallic flexible rubber-like material extending between and through the jaws to integrate them, and an operator for drawing the jaws toward the smaller end of the cone consisting of a sleeve member remote from the jaws slidable in the hollow shaft and long, thin widely spaced radially flexible fingers extending from one end of the sliding member and having their outer ends only in engagement with the jaws, all other parts of the operator being free from engagement with the jaws when the operator draws the jaws toward the small end of the cone so that the force for drawing the jaws is transmitted longitudinally through the fingers which yield radially to avoid all sliding friction between the operator and the jaws during this operation, said fingers being manually detachable from the jaws upon radially inward movement of the fingers independently of the jaws, said rubber-like material holding the jaws in spaced axially alined relation when detached from the fingers.

2. A chuck according to claim 1 in which each of the fingers has a pivotal connection with its associated jaw.

3. A chuck according to claim 1 in which each jaw is adapted for engagement near its opposite ends with a workpiece to hold the latter in axial alinement with the cone.

4. A chuck according to claim 3 in which the free ends of the fingers are provided with apertures and in which the jaws have projections extending through the apertures to engage the workpiece.

References Cited in the file of this patent

UNITED STATES PATENTS

| | | |
|---|---|---|
| 506,024 | Whitlock | Oct. 3, 1893 |
| 693,256 | Furbish | Feb. 11, 1902 |
| 1,680,632 | Palaith | Aug. 14, 1928 |
| 1,766,277 | Blackman | June 24, 1930 |
| 2,459,899 | Stoner | Jan. 25, 1949 |
| 2,683,041 | Haviland | July 6, 1954 |

FOREIGN PATENTS

| | | |
|---|---|---|
| 496,296 | France | July 29, 1919 |
| 566,092 | Great Britain | Dec. 13, 1944 |